United States Patent [19]

Hosaka

[11] Patent Number: 4,488,257

[45] Date of Patent: Dec. 11, 1984

[54] METHOD FOR CONFIRMING INCORPORATION OF A MEMORY INTO MICROCOMPUTER SYSTEM

[75] Inventor: Akio Hosaka, Yokohama, Japan

[73] Assignee: Nissan Motor Company, Limited, Yokohama, Japan

[21] Appl. No.: 338,647

[22] Filed: Jan. 11, 1982

[30] Foreign Application Priority Data

Jan. 12, 1981 [JP] Japan ............................... 56-002063

[51] Int. Cl.³ ............................................ G06F 13/00
[52] U.S. Cl. .................................. 364/900; 324/73 R
[58] Field of Search ......................... 365/1, 200, 201; 364/900 MS File; 324/73 R

[56] References Cited

U.S. PATENT DOCUMENTS 3,898,631  8/1975  Brown et al. ...................... 365/230
4,030,080  6/1977  Burkett et al. ..................... 364/900

FOREIGN PATENT DOCUMENTS 54-139443 of 1979 Japan .
55-153188 of 1980 Japan .

Primary Examiner—James D. Thomas
Assistant Examiner—David L. Clark
Attorney, Agent, or Firm—Schwartz, Jeffery, Schwaab, Mack, Blumenthal & Koch

[57] ABSTRACT

A method of confirming that a memory other than a main memory is incorporated into a computer system, e.g., a microcomputer via a bus comprising the steps of predefining at least one bit line of a parallel bus provided between a receptacle for the memory device and a central processing unit (CPU) so as to impose a logical value, i.e., a "0" or a "1", on the data bus line, that value being the opposite of the predetermined logical value of data stored in a predetermined address of the memory device; operating the CPU to attempt to access the predetermined address of the memory device to read the data stored in the predetermined address of the memory device; and checking to see whether the data read in the central processing unit via the data bus line indicates a value or equal to the predefined value, thus determining that the memory device has or has not been incorporated into the computer. In another method, the bit line is connected via a resistor to an output line. The CPU then imposes a first logical value, and then a second logical value opposite to the first logical value on the bit line, while at the same time trying to access the memory device. If the CPU reads in both cases the value imposed on the bit line by the output line, then the CPU determines that there is no memory device incorporated in the computer.

6 Claims, 6 Drawing Figures

METHOD FOR CONFIRMING INCORPORATION OF A MEMORY INTO MICROCOMPUTER SYSTEM

BACKGROUND OF THE INVENTION

The present invention relates generally to a method for confirming that a memory other than a main memory, e.g. ROM is incorporated into a computer system.

Recently, a control system has been developed which controls the entire operation of an internal combustion engine by using a microcomputer. Such microcomputer control system generally comprises:

(a) a Read Only Memory (usually abbreviated as ROM);

(b) a Central Processing Unit (usually abbreviated as CPU) which fetches a series of instructions (a program) from the ROM, performs arithmetic and logical operations on data inputted via an input interface circuit and/or data stored in the ROM or RAM (described below) in accordance with the fetched instructions, and feeds the arithmetic result to an output interface circuit where the digital arithmetic result is converted into various output signals;

(c) a Random Access Memory (usually abbreviated as RAM) which temporarily stores provisional data required for completion of arithmetic and/or logical operations, the meaning of the term "random access memory" being derived from a storage technique in which the time required to obtain information is independent of the location of the information to be obtained;

(d) Input/Output devices which send or receive various data to or from the CPU via the Input/Output interface circuit; and (e) buses, including a data bus, address bus, and control bus, which provide means for transferring various data, instructions, and control signals between the above-listed units.

In such a microcomputer control system it is sometimes necessary during program execution to confirm that an auxiliary ROM in which updated or modified data, or an instruction sequence is written, or RAM is, incorporated both physically and through programming into the microcomputer system through installation in a proper receptacle.

For example, in a microcomputer control system which uses mask ROM as a master ROM, an auxiliary ROM of small capacity which stores revisions for some of the contents of the master ROM may be provided for modifying or altering the stored contents (program or data) of the master ROM. For that purpose, the microcomputer needs access to the auxiliary ROM before reading the portion of the contents to be altered. Since in such a microcomputer control system the execution sequence of the program will be corrected only when the auxiliary ROM is incorporated into the system, it is necessary to confirm that the auxiliary ROM is incorporated into the system; otherwise, the CPU executes the original program routine in the master ROM.

In prior-art systems in which confirmation such as that described above is required, a means for generating a confirmation signal to detect whether the auxiliary ROM is incorporated into the system is used. The confirmation signal from an input device is inputted into the microcomputer system via the input interface circuit and the program sequence is changed after confirmation as described above.

However, the conventional method described above requires a means for generating the above-described confirmation signal so that the microcomputer control system becomes more complex and the number of input signals to be handled by the input interface circuit becomes greater, and thus the input interface circuit becomes more complex.

SUMMARY OF THE INVENTION

With the above-described problem in mind, it is an object of the present invention to provide a simple method for confirming that a memory device is incorporated into the computer by means already part of the computer itself.

This is accomplished by predefining a bit line of a common parallel output data bus to be a first logical value unless the memory device is present to impose a second logical value different from the first logical value on the bit line. A bit corresponding to the second logical value is stored at a predetermined location in the memory device so that it is put on the predefined line when the predetermined address is accessed. The CPU thus determines whether the memory device has been incorporated by attempting to read data at the predetermined address. If the predefined line maintains its predefined first logical value, the memory device has not been incorporated. Alternatively, the bit line is controllably predefined by the CPU so that the CPU can attempt to redefine the bit line while trying to retrieve and read data from the memory device, and can determine whether the memory device is present by determining whether the bit line is definable, or instead that the memory device is imposing a logical value thereon.

BRIEF DESCRIPTION OF THE DRAWINGS

The features and advantages of the method of confirming that a memory device is incorporated into a microcomputer system according to the present invention will be better appreciated from the following description taken in conjunction with the accompanying drawings in which like reference numerals designate corresponding elements, and in which.

DETAILED DESCRIPTION OF THE PREFERRED EMBODIMENTS

Figure 1:
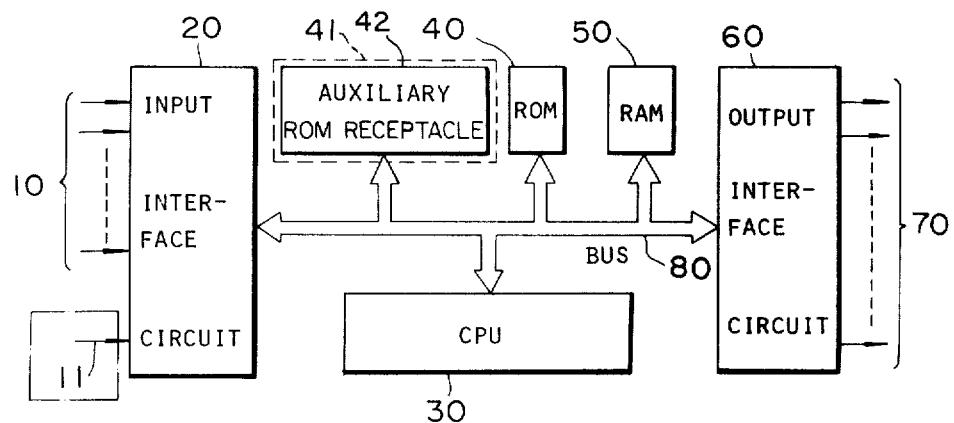
FIG. 1 is a simplified block diagram of a representative microcomputer system where a confirmation signal is inputted as in the prior art.

Reference will be made to the drawings and first to FIG. 1 which shows a conventional configuration of a microcomputer.

The microcomputer comprises:

(a) an Input Interface Circuit 20 which interfaces between input devices and individual internal microcomputer devices;

(b) a Central Processing Unit 30 (CPU) which reads data signals from a specified input device via the Input Interface Circuit and performs a series of arithmetic and logical operations in accordance with a set of preprogrammed instructions and outputs the resulting data;

(c) a Read Only Memory 40 (ROM) which stores the series of pre-programmed instructions to be fetched by the CPU 30;

(d) a Random Access Memory 50 (RAM) which permits reading or writing data via the random access method;

(e) an Output Interface Circuit 60 which interfaces between the internal microcomputer system and output devices; and (f) buses including an address bus, data bus, and control bus which interconnect the Input/Output Interface Circuits 20 and 60, the CPU 30, ROM 40, and RAM 50.

In such a microcomputer system, an auxiliary ROM 41 of small capacity may be incorporated into the microcomputer system by installing it in receptacle means 42 so that updated or corrected data, e.g., in an automotive application, data that changes depending on models of automotive vehicles, can be fetched from the auxiliary ROM in place of some of the contents of the main ROM 40. In the above-described construction of the microcomputer system, the sequence of program execution changes depending on whether or not the auxiliary ROM is electrically connected.

In the conventional method for confirming that the auxiliary ROM 41 is properly connected into the microcomputer system, a means for generating a confirmation signal 11 is provided outside of the input interface circuit 20.

Figure 2:
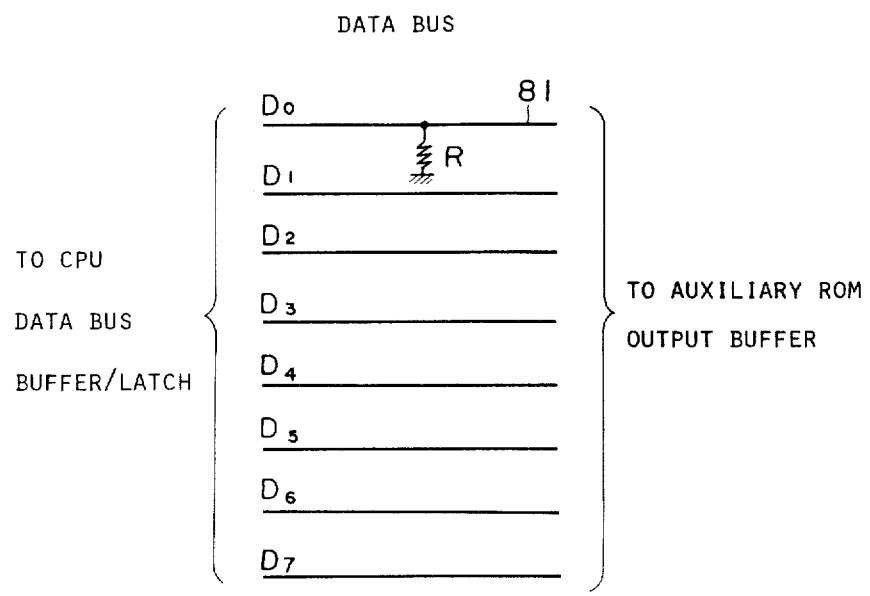
FIG. 2 shows an example of connection of a resistor to one data bus line of a data bus provided between ROM, RAM, other memory, or I/O interface circuit and a CPU (central processing unit) of the microcomputer system in a first preferred embodiment.
Figure 3:
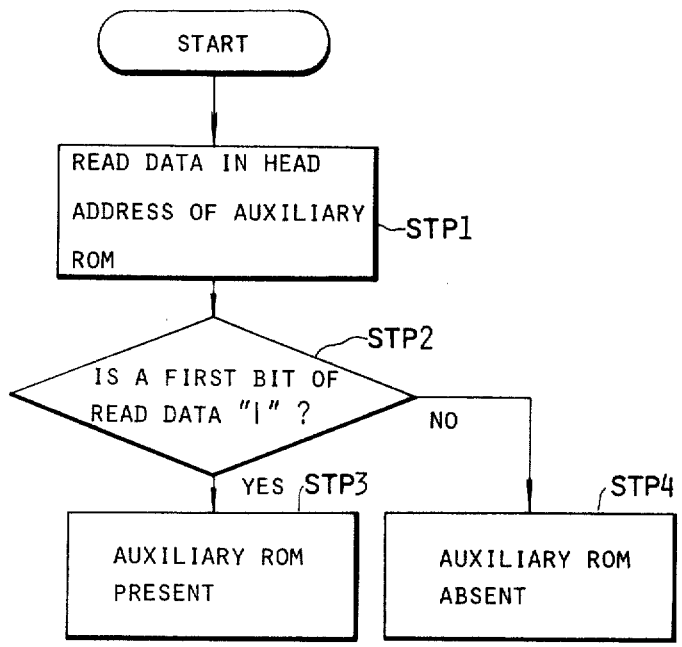
FIG. 3 is a flowchart of the program for confirming that an auxiliary ROM is incorporated into the microcomputer system in the first preferred embodiment.

With reference to FIGS. 2 and 3 a first preferred embodiment according to the present invention will be described hereinafter.

In this preferred embodiment, a logical "1" is previously stored during the assembly of program into the auxiliary ROM 41 in the first bit position of a predetermined address, e.g., head address of the auxiliary ROM 41 and the first bit line 81 of the data bus constituting the bus 80 is connected to a zero volt line via a resistor R as shown in FIG. 2 so that a data bit read via the data bus is positively defined as "1" or "0". Thereafter, the CPU 30 executes the steps in accordance with the flowchart shown in FIG. 3.

The CPU 30 operates to read the data in a predetermined address allocated in the auxiliary ROM 41, e.g., the head address according to the instruction fetched from the main ROM 40, e.g., a conditional branch or jump instruction. In the above-described execution, if the auxiliary ROM 41 is incorporated to the microcomputer system, the signal level of the first bit line $D_o$ shown in FIG. 2 fed from the auxiliary ROM 41 to the CPU 30 becomes "1" via a bus buffer (not shown), maintained as the voltage across the resistor R when the first bit of the data indicating a voltage level corresponding to logical "1" is fetched from the auxiliary ROM 41. Thus, the CPU 30 determines that the auxiliary ROM 41 is incorporated into the CPU 30 via the bus 80 after ensuring that the first bit of the fetched data is equal to that of data to be compared. The data to be compared is, e.g., the contents of the predetermined address in main ROM 40 to which CPU 30 branches or jumps after reading the first bit of data from auxiliary ROM 41. Conversely, if the auxiliary ROM 41 is not electrically connected, the signal level of the first bit line $D_o$ shown in FIG. 2 which would have connected the auxiliary ROM 41 to the CPU 30 is pulled down to indicate a "0" at the resistor R in FIG. 2 since the data bus in this case is not driven by the other ROM 40 or RAM 50, and so indicates a high impedance state or open state. Thus in this case the CPU 30 determines that the auxiliary ROM 41 is not electrically connected to the CPU 30 via the bus since the first bit of the fetched data is not equal to that of data to be compared. The data to be compared is fetched into a register of the CPU 30 from, e.g., the main ROM 40 before reading that data.

As described above, by checking to see whether the first bit of the data is "1" or not, the CPU can decide whether the auxiliary ROM 41 is incorporated into the system.

The same determination can be made when the resistor R is connected between the positive line of the DC bias supply and first bit line $D_o$ of the data bus. If this is done, then the first bit of the data to be fetched from the auxiliary ROM 41 is set to a "0". The CPU 30 fetches the first bit of data as logical "1" when the auxiliary ROM 41 is not incorporated.

It will also be noted that in order to enhance the reliability of the determination described above CPU 30 can check at least one of the remaining bit positions of the data.

Next, a second preferred embodiment according to the present invention is described hereinafter with reference to FIGS. 4 and 5.

In this embodiment, one output terminal 71 of the output interface circuit 60 is connected to the first bit line 81 of the data bus via the resistor R.

Figure 5:
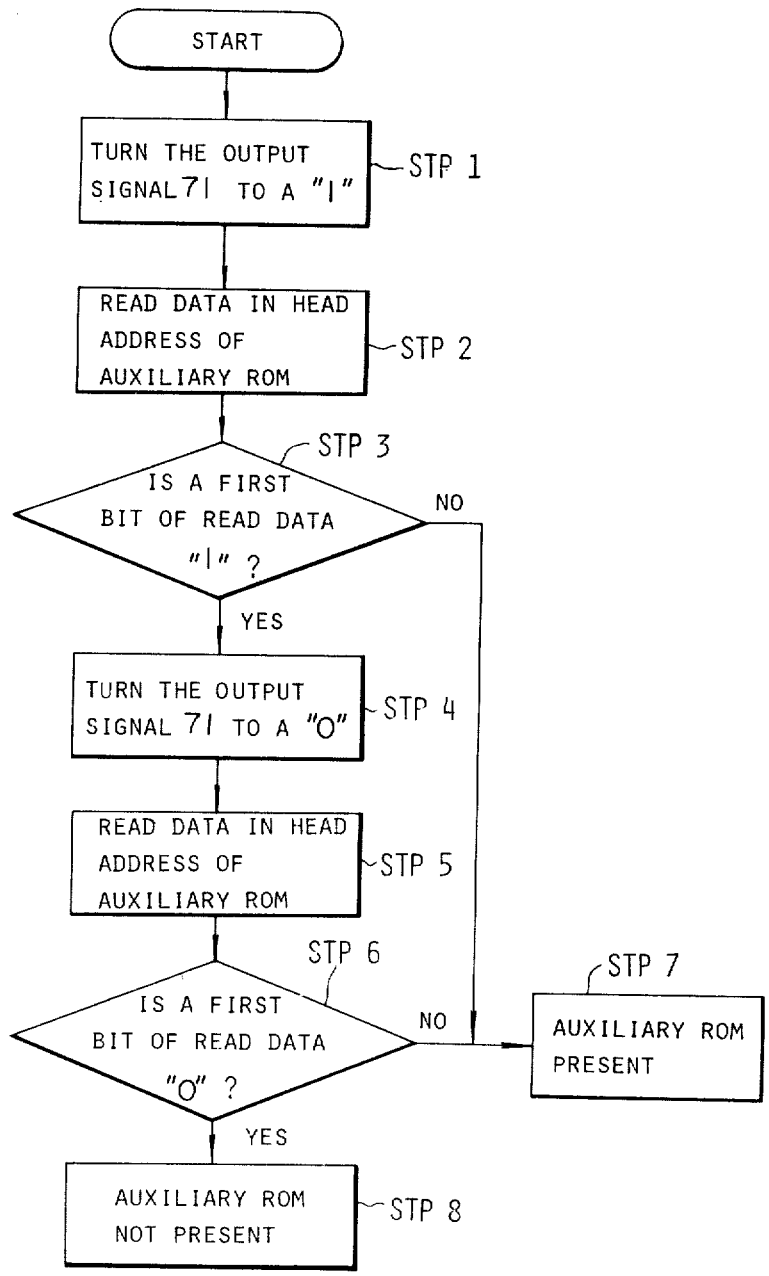
FIG. 5 is another flowchart of the program for confirming that an auxiliary ROM is incorporated into the microcomputer system in the second preferred embodiment.

In the state described above, the CPU 30 performs the following operation in accordance with the flowchart shown in FIG. 5.

First in step STP1, CPU 30 sets an output signal at the output terminal 71 of the Output Interface Circuit 60 equal to a "1" through an output register. In the next step STP2 after the step STP1, the CPU 30 reads data in a predetermined address, e.g., the head address allocated in the auxiliary ROM 41, in order to decide whether the first bit of the data fetched from the address in the auxiliary ROM 41 indicates "1" or not in the next step STP3. If the answer is "No", the CPU determines that the auxiliary ROM 41 is incorporated into the microcomputer system since the first bit line $D_o$ as viewed from the CPU 30 indicates a "0" only when the first bit of data in the head address is a "0".

In the next step STP4 after the step STP3 in the case when the answer is "Yes" in the step STP3, the output signal 71 at the output terminal 71 of the Output Interface Circuit 60 is set equal to "0". Then in a step STP5, the CPU 30 again reads the data stored in the head address in the auxiliary ROM 41 in order to decide whether the first bit of the data fetched from the address in the auxiliary ROM 41 indicates "0" or not.

If the auxiliary ROM 41 is incorporated into the microcomputer system, the first bit value that the CPU 30 has read from the auxiliary ROM 41 remains at a "1" or "0" irrespective of the logical value of the output signal at the output terminal 71 of the Output Interface Circuit 60.

Figure 4:
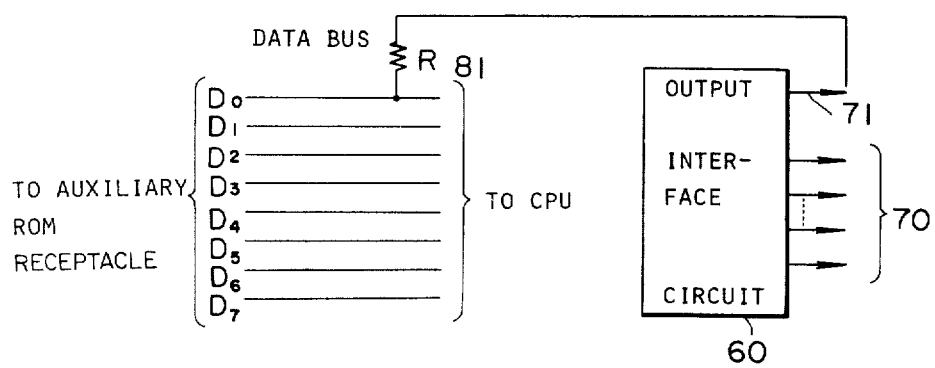
FIG. 4 is a simplified diagram of the connection of a resistor to the data bus line from an output terminal of an output interface circuit in a second preferred embodiment.

Conversely, if the auxiliary ROM 41 is not incorporated, the first bit value that the CPU 30 has read changes so as to remain equal to the logical value of the output signal at the output terminal 71 of the output interface circuit 60 since the first bit line $D_o$ is at a high impedance or open state unless the resistor R is connected as shown in FIG. 4.

Figure 6:
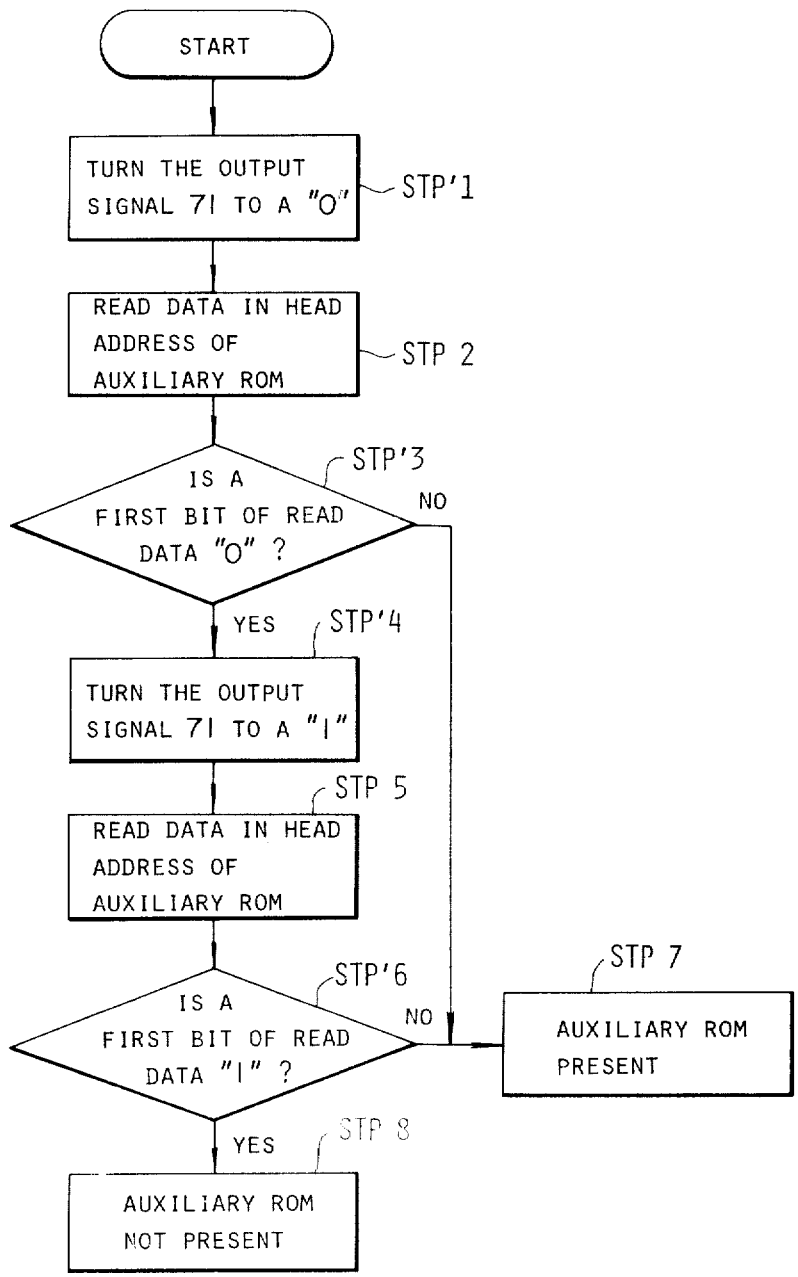
FIG. 6 is an alternative of the flowchart shown by FIG. 5.

In the case when the answers are "YES" both in the steps STP3 and STP6, i.e., the value of read data is always equal to the logical value of the output signal 71, CPU 30 determines that the auxiliary ROM 41 is not incorporated into the mirocomputer system. In other words, when the answer is "NO" at either step STP3 or STP6, i.e., there is a difference between the value of read data and output signal of the output terminal 71 CPU 30 determines that the auxiliary ROM 41 is incorporated into the microcomputer system. In this embodiment, there is an advantage that it is not necessary to store particular perdetermined data in the auxiliary ROM 41, and it is not necessary to determine what data is stored there in order to confirm that the auxiliary ROM 41 is incorporated into the microcomputer system via the bus 80. FIG. 6 shows another example of the flowchart shown by FIG. 5, wherein steps STP'1, STP'3, STP'4, and STP'6 are reversed with those shown in FIG. 5 since the output signal is turned to a "0" at first.

In these preferred embodiments, the case where the CPU judges whether an auxiliary ROM, the contents of which are a revision of part of the contents of the main ROM, is incorporated into the microcomputer system via the bus has been explained.

The same method according to the present invention can be applied to the connection of other memory devices such as RAM.

Furthermore, the method according to the present invention can also be applied well to a method having a CPU confirm that dual types of ROMs, ROM-A and ROM-B, having different addresses allocated to each other have exactly the same contents such as when a Mask ROM is manufactured on a basis of the storage contents of another Programmable ROM.

For example, it might be the case that a ROM-A consists of one four-kilo-byte (256 words×4) Mask ROM whose addresses are allocated as 2000 through 2FFF in hexadecimal notation, and a ROM-B consists of four one-kilo-byte (256 words×1) Programmable ROMs whose addresses are allocated as 3000 through 3FFF in hexadecimal notation, or consists of two two-kilo-byte (256 words×2) Programmable ROMs whose addresses are allocated as 4000 through 4FFF in hexadecimal notation, or consists of one four-kilo-byte Programmable ROM whose addresses are allocated as 5000 through 5FFF and that the ROM-B can be incorporated into any one of the three address areas of 3000 through 3FFF, 4000 through 4FFF, and 5000 through 5FFF. In the above described case, the CPU can decide automatically in which of the address areas the ROM-B is incorporated by using the method described above, i.e., checking to see if the CPU can retrieve the respective data within the addresses, e.g., head address 3000, 4000, and 5000 via a data bus such as that indicated in FIG. 2 or FIG. 4. It will be noted that the CPU can automatically select an address from each address area to be compared with the contents of the ROM-A.

In this way, automatic checking to see whether a ROM-B having the same storage contents as a ROM-A is incorporated into the microcomputer system can be made merely by putting the Programmable ROM(s) into corresponding IC socket(s) depending on each storage capacity and the number of the ROM-B.

As described above, according to the present invention the microcomputer system does not require an extra externally-fed signal for confirming that a memory device is electrically connected into the microcomputer system via the bus. Thus, the whole system is simplified.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. A method of confirming that a memory device is electrically incorporated into a computer, comprising the following steps:
    (a) storing a predetermined bit having a first logical value at a predetermined address in said memory device;
    (b) predefining at least one bit line of a common parallel output data bus connected between a receptacle means for receiving the memory device and a central processing unit of the computer such that said bit line connected to the central processing unit will give a second logical value different from said first logical value if the memory device is not electrically incorporated into the computer;
    (c) operating the central processing unit to attempt to access the predetermined address of the memory device so as to fetch the predetermined bit stored in the predetermined address of the memory device; and
    (d) operating the central processing unit to read all logical values on the common parallel output data bus and to compare the read logical value from the predefined bit line with said first logical value, whereby the central processing unit confirms that the memory device is electrically incorporated into the computer via the receptacle means when the read logical value on the predefined bit line equals said first logical value.

2. The method according to claim 1, wherein said predefining step (b) comprises the step of connecting a resistor between said predetermined bit line of the common parallel output data bus and a line having a voltage corresponding to a logical value opposite that of the predetermined bit.

3. The method according to claim 1, wherein said predefining step (a) comprises the steps of:
    (d) connecting a resistor between said bit line of the common parallel output data line and an output terminal of an output interface circuit of the computer; and
    (e) operating the central processing unit to set said output terminal connected to said bit line via said resistor equal to said second logical value.

4. The method according to claim 3, wherein the central processing unit reads a logical value on the predefined bit line while attempting to fetch data from said memory device and while causing the output terminal connected to the predefined bit line via the resistor to assume the first logical level, and then the second logical level, so that the central processing unit can determine that said memory device is electrically incorporated into said computer by determining a mismatch between said read logical value and one of said first and second logical values.

5. A method of confirming whether a memory device is electrically incorporated into a computer, comprising the steps of:
    (a) predefining at least one bit line of a common parallel output data bus connected between a receptacle means for receiving the memory device and a central processing unit (CPU) of said computer by connecting a resistor between the bit line and an output terminal of an output interface circuit of the computer;
    (b) operating the CPU to set the output terminal connected to the bit line to a first logical level;
    (c) operating the CPU to attempt to retrieve data from said memory device;
    (d) operating the CPU to read a first read value on the bit line;
    (e) operating the CPU to set said output terminal to a second logical level different from said first logical level;
    (f) operating the CPU to attempt to retrieve data from said memory device;
    (g) operating the CPU to read a second read value on the bit line;
    (h) operating the CPU to determine whether the first read value equals the second read value and thus to determine that the memory device has been incorporated when the first read value equals the second read value.

6. A method of confirming whether a memory device is electrically incorporated into a computer, comprising the steps of:
    (a) predefining at least one bit line of a common parallel output data bus connected between a receptacle means for receiving the memory device and a central processing unit (CPU) of said computer by connecting a resistor between the bit line and an output terminal of an output interface circuit of the computer;
    (b) operating the CPU to set the output terminal connected to the bit line to a first logical level;
    (c) operating the CPU to attempt to retrieve data from said memory device;
    (d) operating the CPU to read a first read value on the bit line;
    (e) operating the CPU to set said output terminal to a second logical level different from said first logical level;
    (f) operating the CPU to attempt to retrieve data from said memory device;
    (g) operating the CPU to read a second read value on the bit line;
    (h) operating the CPU to determine whether the first read value equals the first logical value, and the second read value equals the second logical value, and so determine when both determinations are affirmative that said memory device has not been incorporated in said computer.

* * * * *